(No Model.) 2 Sheets—Sheet 1.

A. P. SIBLEY & G. O. WARE.
BUSHING FOR SPLIT PULLEYS.

No. 394,407. Patented Dec. 11, 1888.

WITNESSES.

INVENTORS.
A. P. Sibley and
Geo. O. Ware,
By C. M. Alexander,
Attorney.

UNITED STATES PATENT OFFICE.

ALBERT P. SIBLEY AND GEORGE O. WARE, OF SOUTH BEND, INDIANA.

BUSHING FOR SPLIT PULLEYS.

SPECIFICATION forming part of Letters Patent No. 394,407, dated December 11, 1888.

Application filed July 14, 1888. Serial No. 279,956. (No model.)

*To all whom it may concern:*

Be it known that we, ALBERT P. SIBLEY and GEORGE O. WARE, citizens of the United States, residing at South Bend, in the county of St. Joseph and State of Indiana, have invented certain new and useful Improvements in Bushings for Split Pulleys, of which the following is a specification, reference being had therein to the accompanying drawings, in which—

Figure 1:
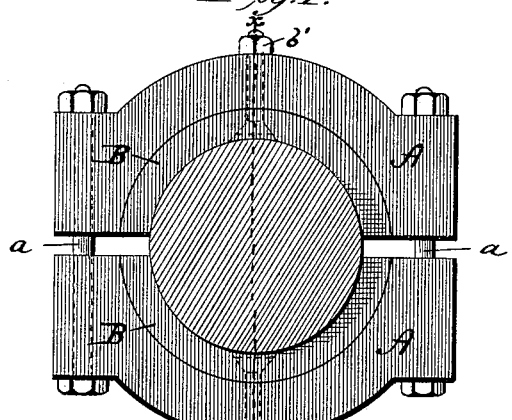
Figure 2:
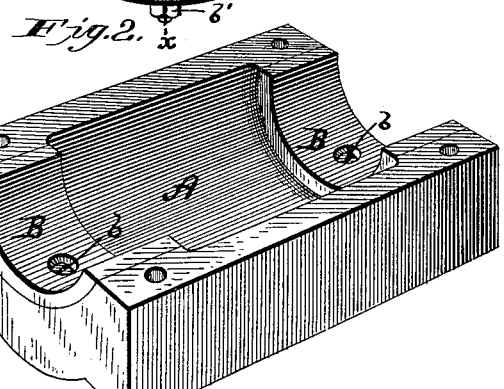
Figure 3:
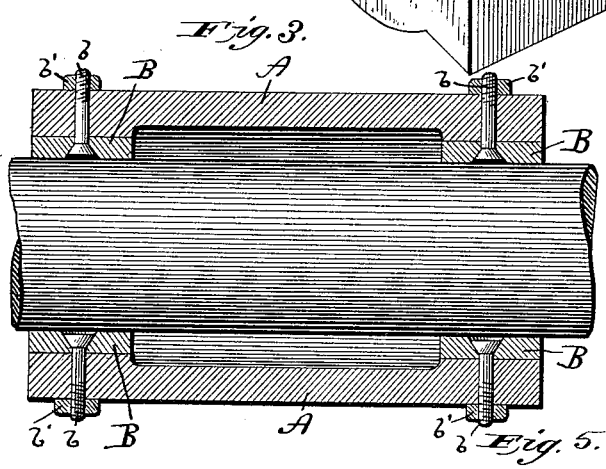
Figure 4:
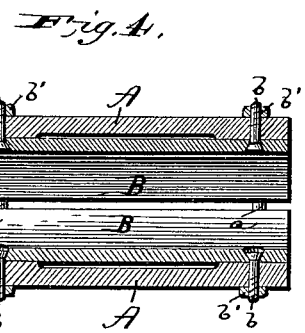
Figure 5:
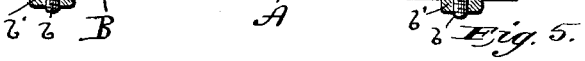
Figure 6:
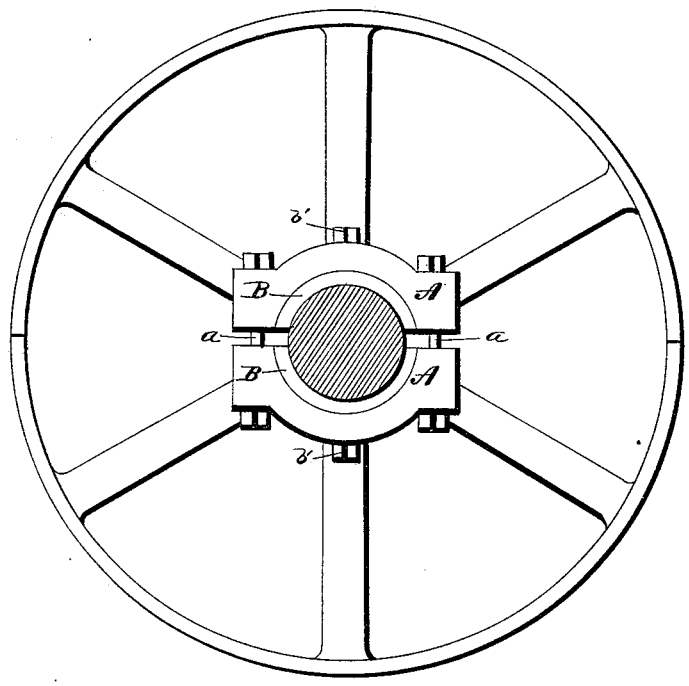

Figure 1 represents an end view of the hub of a separable or split pulley having our improved bushing applied to it; Fig. 2, a perspective view of one-half of the same provided with the bushing; Fig. 3, a vertical longitudinal sectional view taken on the line $xx$ of Fig. 1; Fig. 4, a similar view showing a bushing of a slightly-modified form; Fig. 5, a perspective view of a section of the bushing detached from the hub. Fig. 6 is a side elevation of a complete split pulley provided with our improved bushing.

The invention relates particularly to bushings for separable or split pulleys; and it has for its objects, essentially, to provide an improved bushing for this class of pulleys that will be very simple and inexpensive, and yet subserve all the purposes required of a practical bushing, that will be securely attached to the interior of the sections of the hub, whereby it will not be liable to loss or misplacement when the pulley is removed from or loosened on the shaft, and which will be at the same time readily detachable from the hub-sections, whereby bushings of various sizes or thicknesses may be substituted in order to fit different-sized shafts, as will be more fully hereinafter stated.

Referring to the annexed drawings by letters, A designates the sections of an ordinary separable hub for split pulleys, connected together by the bolts $a$, as shown most clearly in Fig. 1. To this separable hub we apply the sections of our improved bushing. The hub-sections are, as usual, grooved longitudinally on their contiguous faces for the passage of the shaft. Bolted by means of bolts $b$ to the interior faces of these separable sections are the detachable bushing-sections B, the heads of the said bolts being countersunk into the bearing-faces of the bushing-sections, and having applied on their outer ends tightening-nuts $b'$. By thus countersinking the heads of the bolts into the bushing-plates it will be evident that the pulleys may be used either as a loose pulley or fast pulley without injuring the shaft in the least, and by thus passing the bolts from the interior outward the bushing-plates may be tightened at any time without removing the pulley. We prefer to use four bushing-plates and attach two to each section of the hub, as shown in Figs. 1, 2, and 3 of the drawings; but it is evident that we may employ, without departing from our invention in the least, any number of sections. For instance, we may desire to use only two sections and extend them the entire length of the hub, as clearly shown in Fig. 4. It is also evident that the bushing-plates may be constructed of metal, wood, compressed paper, or other suitable material.

The principal advantage of this improved bushing lies in the fact that its sections may be readily removed and replaced at any time with thicker or thinner plates to accommodate different-sized shafts without boring or drilling new holes or using new bolts. Thus by keeping a set of bushings on hand the pulley may be quickly adjusted to a small or large sized shaft, as the exigencies of the case may require. By securely attaching bushing-sections to the hub the liability to loss or misplacement is completely obviated.

Having thus fully described our invention, what we claim as new, and desire to secure by Letters Patent, is—

1. The combination, with the separable sections of the hub, of the bushing-sections curved to fit the inner faces of the hub-sections and perforated for the passage of the securing-bolts, the radial securing-bolts $b$, having their heads countersunk in the faces of the bushing-plates and their outer screw-threaded ends passing through the hub-sections, and nuts $b'$, tapped upon the projecting ends of the said bolts, whereby the bushing-plates may be readily removed or tightened, substantially as described.

2. The combination, with separable hub-sections A A, bolted together, of the four curved bushing-plates B, two of these plates being bolted to each hub-section, radial bolts $b$, for securing the bushing-plates in place, and removable tightening-nuts $b'$, tapped upon the outer projecting ends of the said bolts, substantially as described.

In testimony whereof we affix our signatures in presence of two witnesses.

ALBERT P. SIBLEY.
GEORGE O. WARE.

Witnesses:
SAMUEL C. GROVE,
MYRON CAMPBELL.